United States Patent
Li et al.

(10) Patent No.: US 8,103,176 B2
(45) Date of Patent: Jan. 24, 2012

(54) FREQUENCY OFFSET COMPENSATING APPARATUS AND METHOD, AND OPTICAL COHERENT RECEIVER

(75) Inventors: Lei Li, Beijing (CN); Zhenning Tao, Beijing (CN); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 12/285,234

(22) Filed: Sep. 30, 2008

(65) Prior Publication Data

US 2009/0142076 A1  Jun. 4, 2009

(30) Foreign Application Priority Data

Nov. 30, 2007  (CN) .......................... 2007 1 0196347

(51) Int. Cl.
   *H04B 10/06* (2006.01)
(52) U.S. Cl. .......... 398/208; 398/24; 398/135; 398/140; 398/202
(58) Field of Classification Search ................... 398/24, 398/135, 140, 208
See application file for complete search history.

(56) References Cited

U.S. PATENT DOCUMENTS

| | | | |
|---|---|---|---|
| 6,845,133 B2 * | 1/2005 | Heinrich et al. | 375/346 |
| 2008/0152361 A1 * | 6/2008 | Chen et al. | 398/205 |
| 2011/0129230 A1 * | 6/2011 | Zanoni et al. | 398/140 |

* cited by examiner

*Primary Examiner* — Dung Nguyen
(74) *Attorney, Agent, or Firm* — Staas & Halsey LLP (57) ABSTRACT

The present invention relates to a frequency offset compensating apparatus and method, and an optical coherent receiver. The optical coherent receiver includes a front end processor and a frequency offset estimator, of which said front end processor converts an inputted optical signal into a base band digital electric signal, and said frequency offset estimator estimates a phase offset change introduced by a frequency offset in said base band digital electric signal; said frequency offset compensating apparatus comprises an M output integrator, for integrating the phase offset change introduced by the frequency offset to acquire M inverse numbers of the phase offset introduced by the frequency offset, where M is an integer greater than 1; a series-parallel converting device, for dividing said base band digital electric signal into M sub base band digital electric signals; M complex multipliers, for constructing the corresponding inverse numbers in the M inverse numbers to be complex numbers, and multiplying them with the corresponding sub base band digital electric signals in the M sub base band digital electric signals; and a parallel-series converting device, for converting the M sub base band digital electric signals multiplied by said complex multipliers into a base band electric signal.

8 Claims, 9 Drawing Sheets

FREQUENCY OFFSET COMPENSATING APPARATUS AND METHOD, AND OPTICAL COHERENT RECEIVER

FIELD OF THE INVENTION

The present invention relates to optical communications, and more particularly, to an optical coherent receiver.

BACKGROUND OF THE RELATED ARTS

With the gradual enhancement on the requirements of capacity and flexibility of the optical communication system, the coherent optical communication technology has become more and more important. In comparison with incoherent technology (such as on-off key, OOK) or self-coherent technology (such as differential quadrature phase-shift keying, DQPSK), the coherent technology has the following advantages: optical signal-to-noise ratio (OSNR) gain of approximately 3 dB; the capability to use more efficient modulation technologies (such as quadrature modulation, QAM) to enhance transmission capacity, and the capabilities to make convenient use of electric equalization technology in response to channel change, and lower production cost, etc. Coherent reception requires that the frequency and phase of the local oscillation be identical with the phase of the carrier wave, that is to say, the difference in phases (phase offset) and difference in frequencies (frequency offset) between the local oscillator and the carrier wave should be zero, for otherwise phase offset and frequency offset not being zero would appear in the received base band signal to thereby greatly affect the performance of the coherent receiver. In an electric coherent receiver, the phase offset and frequency offset are removed by means of a phase locked loop that precisely controls the phase and frequency of the local oscillation. However, insofar as optical coherent reception is concerned, due to restrictions of such factors as the technologies and standardization of optical devices, it is very difficult to implement a phase locked loop in the receiver to carry out precise control of the local oscillator laser. There is hence a need in the optical coherent receiver for a new technique to remove the influences brought to the performance of the receiver by the frequency offset and phase offset of the base band signal. There have currently been certain technologies in application to compensate the phase offset in the base band signal, but a precondition for proper operation of these technologies is the extremely low frequency offset (to the level of MHz).

Figure 1:
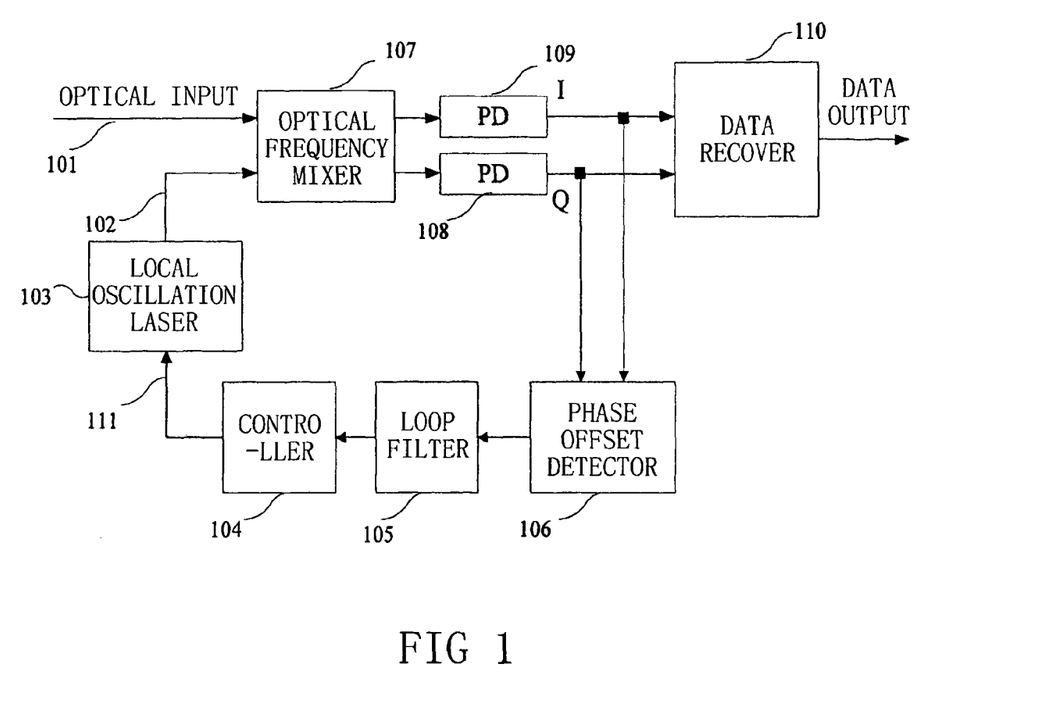
FIG. 1 shows a known optical coherent receiver employing a phase locked loop.

FIG. 1 shows an optical coherent receiver employing a phase locked loop. In FIG. 1 a phase offset detector 106, a loop filter 105 and a controller 104 constitute the phase locked loop. The output 111 of the phase locked loop controls a local oscillator laser 103 to make consistent the frequency and phase of the output 102 of the local oscillation laser 103 with the frequency and phase of the carrier wave. In addition, an optical frequency mixer 107, and photoelectric detectors (PD) 108 and 109 in FIG. 1 constitute a front end processor for converting an inputted optical signal 101 into a base band electric signal. A data recover 110 recovers data signal. Due to restrictions of such factors as the technologies and criteria of optical devices, it is very difficult to realize the receiver as shown in FIG. 1. Accordingly, some technologies have been proposed to process the base band digital signal so as to remove the phase offset.

Figure 2:
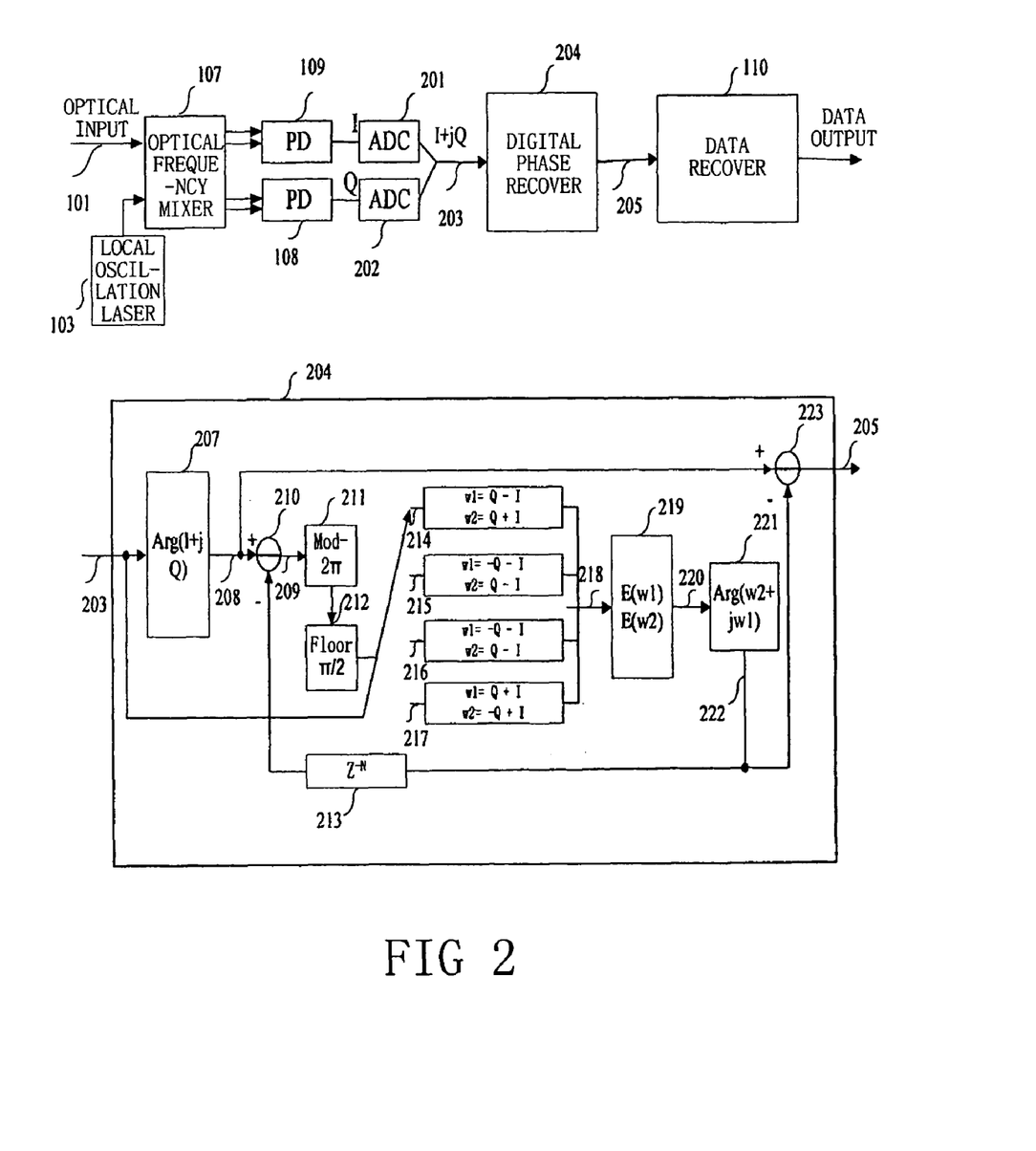
FIG. 2 show a prior art optical coherent receiver employing the digital phase recovery technology.

FIG. 2 shows an optical coherent receiver employing digital phase recovery technology. In comparison with FIG. 1, no control is performed in FIG. 2 to the local oscillation laser 103, instead, a digital phase recover 204 is employed to remove the phase offset between the local oscillation and the carrier wave. The digital phase recover 204 averages the phase offsets of a plurality of continuous symbols to remove noise so as to obtain the actual phase offset, and then makes use of this phase offset to correct the phases of these symbols so as to remove the phase offset. In FIG. 2, an optical frequency mixer 107, photoelectric detectors 108 and 109, and analog-to-digital converters 201 and 202 constitute a front end processor for converting an optical signal into a base band digital electric signal 203. As can be seen from the foregoing explanation, the working principle of the digital phase recover is to regard the phase offset of the plurality of continuous symbols as a constant number. However, when the frequency offset is not zero, the phase offset of the symbols varies with variations in time. Consequently, when the frequency offset is greater than tens of MHz, the digital phase recover cannot operate normally. Whereas in an actual optical communication system, the frequency offset might be as high as several GHz due to the influences of such factors as temperature. Accordingly, frequency offset compensation is indispensable in any optical coherent receiver employing the digital phase recovery technology.

FIG. 2 further shows an example of a prior art digital phase recover. However, the digital phase recover can also be realized by other devices as long as they can recover digital phase. As shown in the lower portion of FIG. 2, the input of the digital phase recover is the base band electric signal 203 outputted by the front end processor of the coherent receiver, namely, $I+jQ=\exp(j\theta_d+j\theta)$. In general cases, the base band electric signal 203 contains not only data information $\theta_d$ but also phase offset $\theta$ between the carrier wave and the local oscillator. The base band electric signal 203 is firstly inputted to an argument calculator 207 to obtain an argument 208. The argument 208 is respectively inputted to a subtracter 223 and a subtracter 210. A feedback phase difference before N symbols is subtracted from the argument 208 at the subtracter 210 to coarsely obtain the data phase, and then inputted to a $2\pi$ modulo calculator 211 and a quotient rounder 212. The $2\pi$ modulo calculator performs a $2\pi$ modulo calculation on the signal and restricts it to between 0 and $2\pi$, and the quotient rounder divides the signal having been restricted to between 0 and $2\pi$ by the $2\pi$ modulo calculator by a predetermined value (such as $\pi/2$), and rounds up the integral portion. The signal 203 is inputted to phase offset complex value extracting sections 214, 215, 216 or 217 in accordance with the result of the quotient rounder 212. The phase offset complex value extracting sections obtain a real part w2 and a imaginary part w1 of a phase offset $\sqrt{2} \exp(j\theta)$ represented by complex numbers as shown by the formula in FIG. 2, for example.

Noise in the estimated imaginary part and real part is removed by a noise removing device 219. The noise removing device can for instance be realized by an averager. The averager is a simple device that performs mathematical averaging on the N symbols, and can be used to remove noise. Subsequently, the argument calculator 221 obtains the argument $\theta$ of the averaged complex number $w_{2+jw1}=\sqrt{2}(\cos(\theta)+j\sin(\theta))=\sqrt{2}\exp(j\theta)$, and outputs the same, namely a phase offset 222. The phase offset 222 is subtracted from the signal 208 at the subtracter 223 and outputted as the recovered digital phase. At the same time, the phase offset 222 is further supplied to a subtracter 209 for the next round of application after passing through a delaying device 213 to have been delayed for N symbols.

To make it easy for description, the subtracter 223 can be regarded as a phase recover, and the remaining component parts (namely the argument calculator 207, the subtracter 210, the $2\pi$ modulo calculator 211, the quotient rounder 212, the phase offset complex value extracting sections 214-217, the noise removing device 219 and the argument calculator 221, etc.) can be regarded as phase offset calculating sections.

SUMMARY OF THE INVENTION

The present invention is proposed in view of the foregoing circumstances of the state of the art, and aims to remove one or more problems due to restrictions and defects existent in the state of the art.

According to the first aspect of the present invention, there is provided a frequency offset compensating apparatus for an optical coherent receiver including a front end processor and a frequency offset estimator, of which said front end processor converts an inputted optical signal into a base band digital electric signal, and said frequency offset estimator estimates a phase offset change introduced by a frequency offset in said base band digital electric signal; said frequency offset compensating apparatus comprises an M output integrator, for integrating the phase offset change introduced by the frequency offset and estimated by said frequency offset estimator to acquire M inverse numbers of the phase offset introduced by the frequency offset, where M is an integer greater than 1; a series-parallel converting device, for dividing said base band digital electric signal into M sub base band digital electric signals; M complex multipliers, for constructing the corresponding inverse numbers in the M inverse numbers outputted by said M output integrator to be complex numbers, and multiplying them with the corresponding sub base band digital electric signals in the M sub base band digital electric signals converted by said series-parallel converting device; and a parallel-series converting device, for converting the M sub base band digital electric signals multiplied by said complex multipliers into a base band electric signal.

According to the second aspect of the present invention, there is provided the frequency offset compensating apparatus according to the first aspect of the present invention, wherein said M output integrator comprises a multiplier, a plurality of integrating units arranged in series and a delaying unit, wherein said multiplier multiplies the phase offset change introduced by the frequency offset and estimated by said frequency offset estimator with −1 to acquire an inverse number of the phase offset change introduced by the frequency offset, which inverse number is inputted into each of the integrating units; each integrating unit in said M integrating units arranged in series integrates the inputted phase offset change to acquire a phase offset introduced by the frequency offset; an integrating output of the last integrating unit in said M integrating units arranged in series is inputted into the corresponding complex multiplier and simultaneously outputted into said delaying unit, and integrating outputs of the remaining integrating units in said M integrating units arranged in series are inputted into the corresponding complex multipliers and simultaneously inputted into the next integrating unit; and the first integrating unit in said M integrating units arranged in series integrates the inverse number and the integrating output of the last integrating unit having been delayed one symbol by said delaying unit.

According to the third aspect of the present invention, there is provided the frequency offset compensating apparatus according to the second aspect of the present invention, wherein each of said integrating units comprises an adder and a $2\pi$ modulo calculator arranged in series, the adder of the first integrating unit in said M integrating units arranged in series adds the inverse number to the integrating output of the last integrating unit having been delayed by said delaying unit, said $2\pi$ modulo calculator performs a $2\pi$ modulo calculation on the addition result of the adder, the adder of each of the integrating units other than the first integrating unit in said M integrating units arranged in series adds the inverse number to an output of the previous integrating unit, and said $2\pi$ modulo calculator performs a $2\pi$ modulo calculation on the addition result of the adder.

According to the fourth aspect of the present invention, there is provided the frequency offset compensating apparatus according to the first aspect of the present invention, wherein said M output integrator comprises M integrating units arranged in parallel and a delaying unit, an output of said delaying unit is inputted into each of the integrating units in said M integrating units arranged in parallel; each of the integrating units in said M integrating units arranged in parallel integrates the inputted phase offset change introduced by the frequency offset, outputs the phase offset of each symbol introduced by the frequency offset, namely integrating output, and respectively inputs the integrating output into the corresponding complex multiplier; and the last integrating unit, namely the Mth integrating unit, in said M integrating units arranged in parallel further inputs its integrating output into said delaying unit, and said delaying unit delays the integrating output by one symbol as the output of said delaying unit to be inputted into each of the integrating units.

According to the fifth aspect of the present invention, there is provided the frequency offset compensating apparatus according to the fourth aspect of the present invention, wherein each integrating unit of said M integrating units arranged in parallel comprises a multiplier, an adder and a $2\pi$ modulo calculator, of which the multiplier of each integrating unit is respectively multiplied with −1 to −M; the adder of each integrating unit adds the output of the multiplier to the output of the last integrating unit of said plurality of integrating units arranged in parallel; and the $2\pi$ modulo calculator of each integrating unit performs $2\pi$ modulo calculation on the addition result of the adder.

According to the sixth aspect of the present invention, there is provided a frequency offset compensating apparatus inbuilt in a phase offset compensating apparatus of an optical coherent receiver including a frequency offset estimator, which estimates a phase offset change introduced by a frequency offset in a base band digital electric signal of said optical coherent receiver; said frequency offset compensating apparatus comprises a first integrating unit, for integrating the phase offset change to acquire an inverse number of the phase offset of a single symbol; a multiplier, for multiplying the phase offset change with an average length of said phase offset compensating apparatus; and a second integrating unit, for integrating an output of the multiplier to acquire an inverse number of the output of the multiplier.

According to the seventh aspect of the present invention, there is provided the frequency offset compensating apparatus according to the sixth aspect of the present invention, characterized in that each of the first integrating unit and the second integrating unit comprises, arranged in series into annularity, an adder, a $2\pi$ modulo calculator and a delaying unit, wherein the phase offset change is inputted into the adder of the first integrating unit, the output of the multiplier is inputted into the adder of the second integrating unit, the outputs of the first integrating unit and the second integrating unit are the output of the $2\pi$ modulo calculator, and the delaying unit delays the output of the $2\pi$ modulo calculator by one symbol.

According to the eighth aspect of the present invention, there is provided a phase recover which comprises the frequency offset compensating apparatus according to the sixth or seventh aspect of the present invention; a first interface, for receiving the output of the first integrating unit of the frequency offset compensating apparatus; a second interface, for receiving the output of the second integrating unit of the frequency offset compensating apparatus; a phase offset calculating unit, for calculating phase offset in accordance with the inputted base band electric signal and the input of the first integrating unit; and a phase offset recovering unit, for subtracting the output of the first integrating unit and the output of the second integrating unit from the phase offset to recover data phase in said base band electric signal.

According to the ninth aspect of the present invention, there is provided an optical coherent receiver, which comprises a front end processor, for changing an inputted optical signal into a base band electric signal, and a frequency offset estimator, for estimating a frequency offset in said base band electric signal; and which is characterized in further comprising the frequency offset compensating apparatus according to any one of the aforementioned first to seventh aspects, for compensating a phase offset introduced by the frequency offset in said base band electric signal in accordance with the frequency offset estimated by said frequency offset estimator.

According to the tenth aspect of the present invention, there is provided the optical coherent receiver according to the ninth aspect of the present invention, which is characterized in further comprising a coarse frequency offset monitoring unit, for coarsely controlling the frequency offset in the base band electric signal outputted by said front end processor; and a digital equalizer, for equalizing the base band electric signal outputted by said front end processor; wherein said frequency offset estimator estimates the frequency offset in the base band electric signal or estimates the frequency offset in the base band electric signal having been equalized by the digital equalizer.

According to the eleventh aspect of the present invention, there is provided the optical coherent receiver according to the ninth aspect of the present invention, which is characterized in comprising the frequency offset compensating apparatus according to the aforementioned first to fifth aspects; said optical coherent receiver further comprises a digital equalizer and an integrator; wherein said front end processor is connected to said frequency offset compensating apparatus, and said frequency offset compensating apparatus is connected to said digital equalizer; said digital equalizer equalizes the base band electric signal having been compensated by said frequency offset compensating apparatus, and inputs the equalized signal into said frequency offset estimator; said frequency offset estimator estimates the frequency offset in the signal outputted by said digital equalizer, and outputs the frequency offset into said integrator; and said integrator integrates the frequency offset, and outputs the integrated signal into said frequency offset compensating apparatus.

DRAWINGS ACCOMPANYING THE DESCRIPTION

Detailed explanations to the present invention with reference to the accompanying drawings make it possible to comprehend the aforementioned and other characteristics, advantages and objectives of the present invention in a clearer manner, in the drawings.

SPECIFIC EMBODIMENTS

Preferred embodiments of the present invention are explained below with reference to the accompanying drawings. These embodiments are exemplary and illustrative of, rather than restrictive to, the present invention.

Figure 3A:
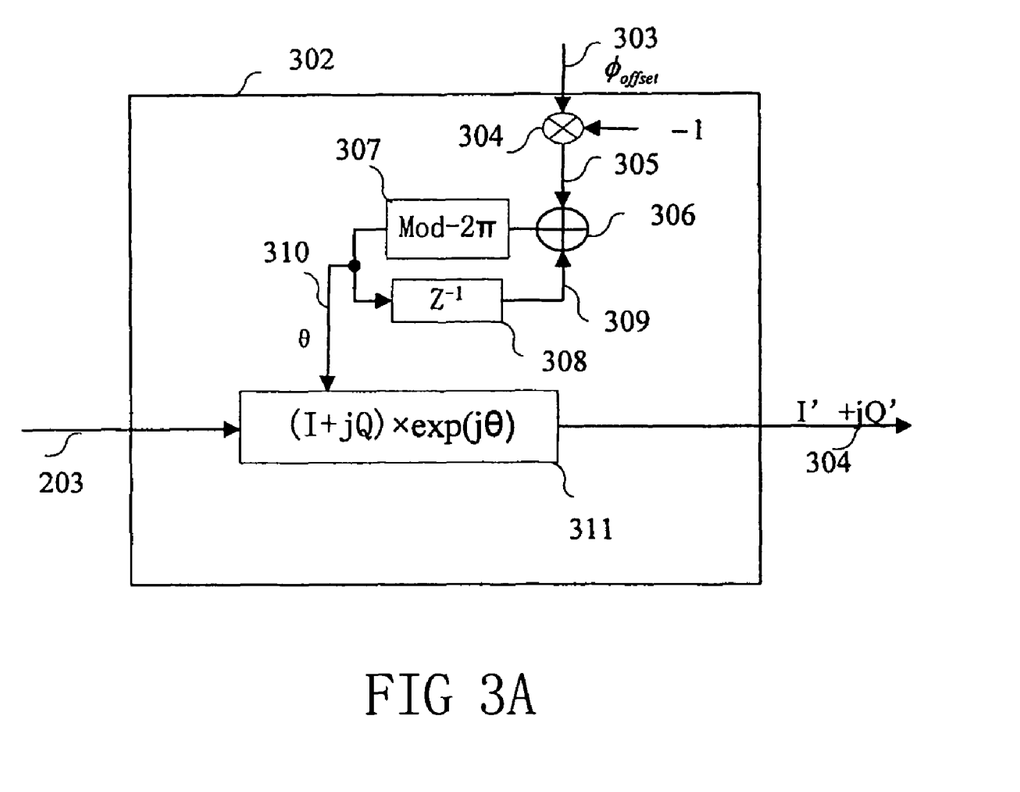
FIG. 3 shows a frequency offset compensating apparatus according to one embodiment of the present invention.
Figure 3B:
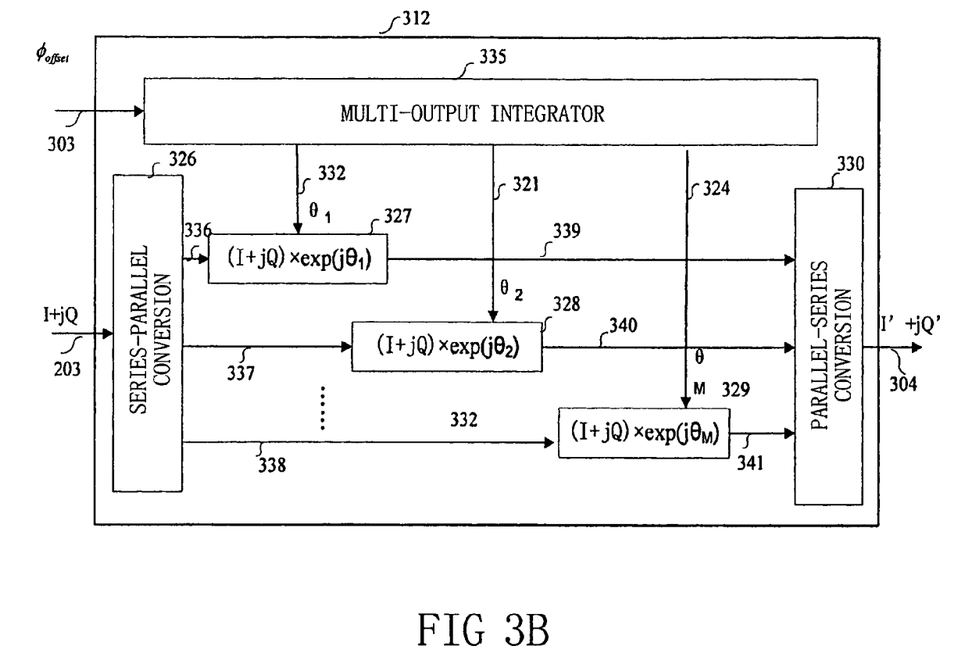

FIG. 3 shows a frequency offset compensating apparatus according to the first embodiment of the present invention. FIG. 3A illustrates serial implementation of the apparatus, and FIG. 3B illustrates parallel implementation of the apparatus. In FIG. 3A, the input 203 is a received base band digital signal; when there is frequency offset, the input 203 can be expressed as $I+jQ=\exp(j\phi_d+j\phi+jk\Delta\omega T)$, where $\phi_d$ is data information, $\phi$ is phase offset introduced by line width of the laser etc., $\Delta\omega$ is frequency offset, T is symbol period, k indicates time sequence of the arriving symbols, $k\Delta\omega T$ is phase offset introduced by the frequency offset, and j indicates an imaginary number unit. The input 303 is phase offset change (namely $\Delta\omega T$) introduced by the frequency offset within one symbol period as estimated by the frequency offset estimator. The input 303 is multiplied with −1 by means of a multiplier 304 to obtain an inverse number 305 of the input 303. The adder 306, the $2\pi$ modulo calculator 307 and the register 308 in FIG. 3A constitute an integrator, whose output 310 is the inverse number (namely $\theta=-k\Delta\omega T$) of the phase offset introduced by the frequency offset. The output 310 is fed to the complex multiplier 311. The complex multiplier 311 constructs the complex number $\exp(j\theta)$ in accordance with the output 310, and multiplies the same with the input 203 to obtain the output 304. Such complex multiplication can be expressed by the following formula:

$$I'+jQ'=(I+jQ)\times\exp(j\theta)=\exp(j\phi_d+j\phi+jk\Delta\omega T)\times\exp(-k\Delta\omega T)=\exp(j\phi_d+j\phi).$$

As shown above, the argument of the output 304 (namely I'+jQ') does not contain the phase offset introduced by the frequency offset any more.

FIG. 3B illustrates parallel implementation of the frequency offset compensating apparatus according to the first embodiment of the present invention. Such a parallel frequency offset compensating apparatus 312 comprises a series-parallel converter 326, a parallel-series converter 330, a multi-output integrator 335, and M complex multipliers. M is the number of parallel processing circuits. The series-parallel converter 326 converts inputted continuous base band digital signals into M parallel outputs, for instance, the first 336 is the first symbol, and the second 337 is the second symbol, etc. The M outputs are respectively fed into the M complex multipliers, such as the complex multipliers 327, 328 and 329 shown in the Figure. The input 303 is the phase offset change introduced by the frequency offset within one symbol period. The multi-output integrator 335 performs calculation in accordance with the input 303, and outputs an inverse number of the phase offset introduced by the frequency offset in the phase of each symbol. For instance, the outputs 332, 321 and 324 in the Figure are respectively the inverse numbers of the phase offsets introduced by the frequency offsets in the first symbol, the second symbol and the Mth symbol. The M outputs of the multi-output integrator 335 are also respectively fed into the M complex multipliers. Each complex multiplier constructs the complex number exp (j$\theta_i$) (i from 1 to M) in accordance with the inputted phase offset and multiplies the same with the inputted symbol to thereby compensate the influence of the frequency offset on the phase of the symbol. Outputs of the complex multipliers are incorporated into one serial and continuous output after passing through the parallel-series converter 330.

Figure 4A:
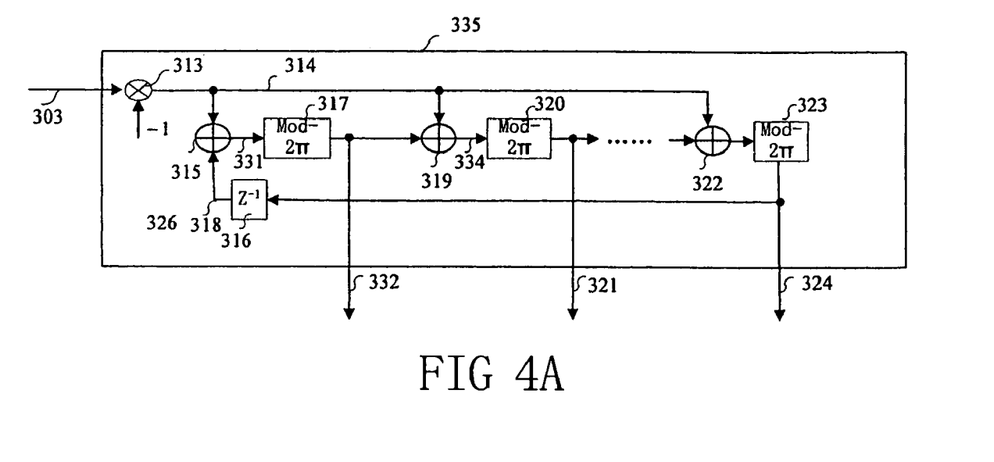
FIG. 4 provides two implementation methods of the multi-output integrator shown in FIG. 3B.

FIG. 4 provides two implementation methods of the multi-output integrator as shown in FIG. 3B. As shown in FIG. 4A, the multi-output integrator according to the first method employs the cascade connection of the adders. Specifically, the input 303 is multiplied with −1 to obtain the signal 314, which is fed into N adders respectively, such as the adders 315, 319 and 322 in the Figure. The first adder 315 adds the signal 314 to the output 318 of the register 316 to obtain the signal 331. The 2π modulo calculator 317 restricts the value of the signal 331 between the interval of [0, 2π]. The output 332 (namely $\theta_1$) of the 2π modulo calculator 317 is fed into the complex multiplier 327 to compensate the frequency offset of the first symbol. At the same time, the output 332 is fed into the second adder 319, which adds the output 332 to the signal 314, whereby the summation is performed with 2π modulo calculation by the modulo calculator 320 to obtain the signal 321 (namely $\theta_2$), which is fed into the complex multiplier 328 to compensate the frequency offset of the second symbol. By analogy, the inverse numbers of the phase offsets introduced by the frequency offsets are obtained by combinations of each of the adders and each of the modulo calculators, and are inputted to the corresponding complex multipliers. The output 324 of the last modulo calculator 323 is used to compensate the frequency offset of the Mth symbol, and the output 324 is fed at the same time into the register 316 in preparation for compensating the M+1th symbol. The combination of each adder with each modulator can be referred to as the integrating unit.

Figure 4B:
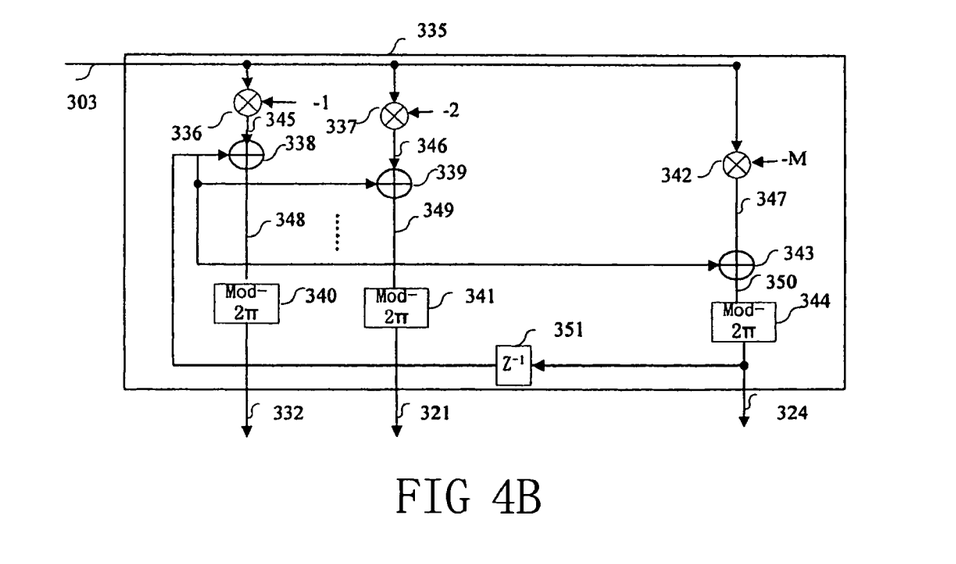

As shown in FIG. 4B, another implementation of the multi-output integrator 305 is to multiply the input 303 respectively with −1 and −M (it is also possible to multiply the result of multiplying with −1 with 1 to M, respectively) to obtain the phase offset changes on the phases from the first to the Mth symbols and introduced by the frequency offset as regards the previous Mth symbol, whereas the outputs 345, 346 and 347 of the multipliers are respectively added to the phase offset (which is registered in the register 351) of the previous Mth symbol by the adders 338, 339 and 343, so as to obtain the phase offsets 348, 349 and 350 on the phases from the first to the Mth symbols and introduced by the frequency offset. These phase offsets are respectively fed into the 2π modulo calculators 340, 341 and 344 to be restricted of their values between the interval of [0, 2π]. Thus, signals 332, 321 and 324 are obtained to compensate the frequency offset.

The frequency offset compensating apparatus as shown in FIG. 3A is required to complete all calculations shown in FIG. 3A within one symbol period, and this puts a very high demand on the processing speed of the hardware. Whereas the parallel implementation of the frequency offset compensating apparatus as shown in FIG. 3B assigns the processing of N symbols to N hardwares to complete, and it suffices for each hardware to complete its processing within N symbol periods. This reduces the processing speed of the hardware by N times without affecting the performance of compensation, thereby greatly facilitating hardware implementation of the frequency offset compensating apparatus.

Figure 5:
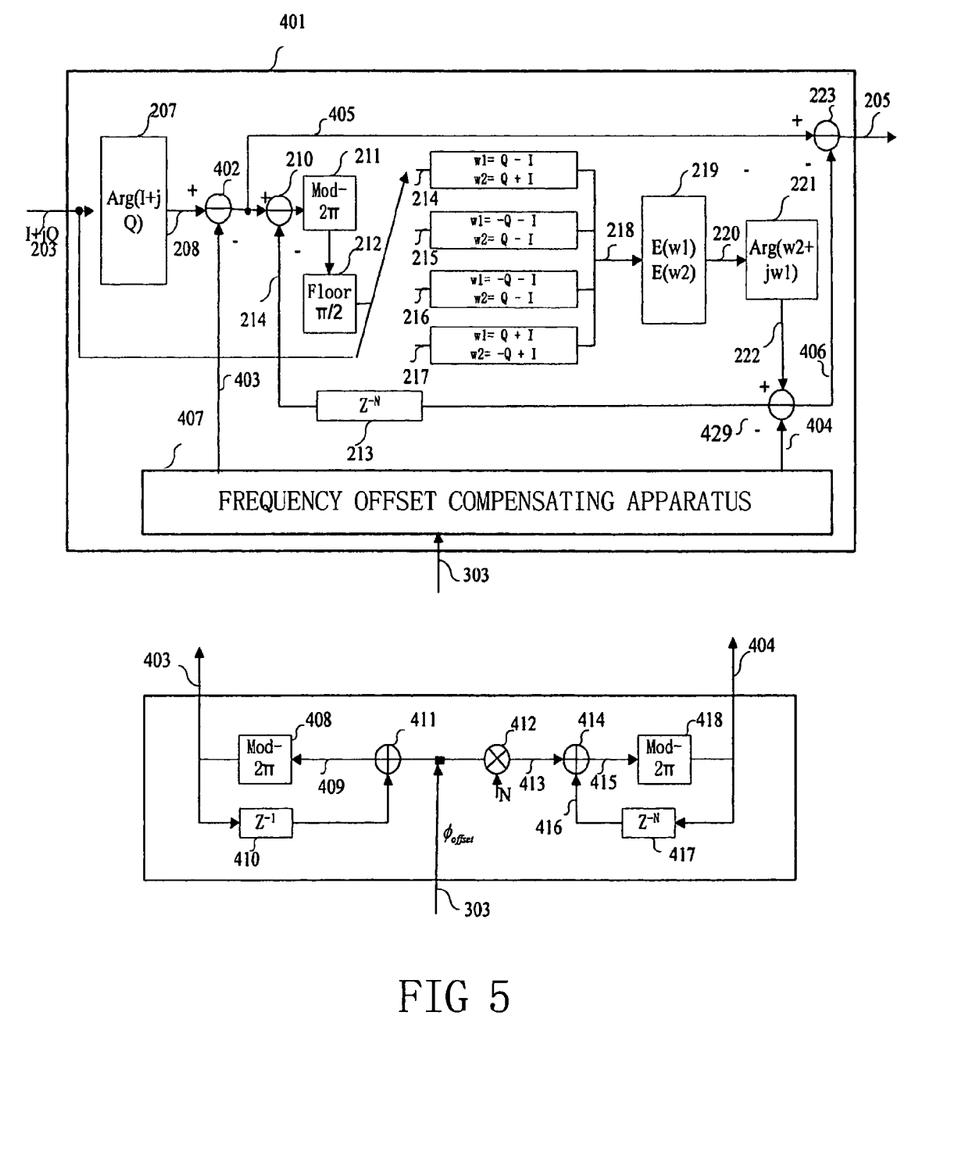
FIG. 5 shows a frequency offset compensating apparatus according to another embodiment of the present invention and a digital phase recovering device incorporating the frequency offset compensating apparatus.

FIG. 5 shows a frequency offset compensating apparatus according to another embodiment of the present invention. The frequency offset compensating apparatus as shown in FIG. 3 should be arranged before the phase recovering device, that is to say, frequency offset compensation is performed prior to recovering the phase. By contrast, the frequency offset compensating apparatus shown in FIG. 5 is integrated in the digital phase recovering device to carry out frequency offset compensation at the same time of recovering the phase. The digital phase recovering device shown in FIG. 5 is a digital phase recovering device 401 that incorporates the frequency offset compensating apparatus 407 according to the present invention. In order to explain the working principle of this device, it is first explained below of what influence there is of the frequency offset to the digital phase recovering device shown in FIG. 2. Suppose the frequency offset be Δω, and the inputted base band digital signal can be expressed as I+jQ=exp(j$\phi_d$+j$\phi$+jkTΔω). The output 208 of the argument calculator 207 in FIG. 2 is $\phi_d$+$\phi$+kTΔω, and the estimated phase offset 222 can be expressed as $$\phi'_{est} = \arg\left[\sum_{k=1}^{N} (e^{j(\phi+kT\Delta\omega)} + n_k)\right]$$
$$= \arg\left(e^{j\phi}\sum_{k=1}^{N} e^{jkT\Delta\omega} + e^{j\phi}\sum_{k=1}^{N} n_k\right)$$
$$= \phi + \arg\left(\frac{e^{jNT\Delta\omega} - 1}{e^{jT\Delta\omega} - 1}\right),$$

where N indicates the average length of the digital phase offset recovering device, and $n_k$ indicates noise. As regards the N symbols that immediately follow, the value of the phase offset 222 is $$\phi''_{est} = \arg\left[\sum_{k=N+1}^{2N} (e^{j(\phi+kT\Delta\omega)} + n_k)\right]$$
$$= \arg\left(e^{j\phi}e^{jN\Delta\omega T}\sum_{i=1}^{N} e^{jkT\Delta\omega} + e^{j\phi}\sum_{i=1}^{N} n_k\right)$$
$$= \phi + N\Delta\omega T + \arg\left(\frac{e^{jNT\Delta\omega} - 1}{e^{jT\Delta\omega} - 1}\right).$$

As can be seen from the above analysis, the existence of the frequency offset introduces the phase offset that varies with time in the argument of the symbol on the one hand, that is to say, the phase offset of each symbol is augmented with ΔωT as compared with the previous symbol; and on the other hand, the existence of the frequency offset also introduces the offset that varies with time in the estimated phase offset with regard to every N symbols, that is to say, the offset of the estimated value of the phase offset for every N symbols is augmented with $N\Delta\omega T$ as compared with that of the previous N symbols. The principle for integrating the frequency offset compensating apparatus according to the present invention is precisely to remove the offsets of the aforementioned two aspects as introduced by the frequency offset at the same time of recovering the phase, so as to compensate the influence of the frequency offset on the performance of the receiver.

The input 303 of the frequency offset compensating apparatus 407 in this embodiment of the present invention is the output of the frequency offset estimator, namely the phase offset change ($\Delta\omega T$) introduced by the frequency offset within one symbol period. The input 303 is respectively inputted to two branches, of which one branch is an integrator (the first integrator) consisting of the adder 411, the $2\pi$ modulo calculator 408 and the register 410, wherein the output 403 (the first integrating output) of this branch is the phase offset (namely $k\Delta\omega T$) of the symbol introduced by the frequency offset, and of which another branch is multiplied with N (N is the average length of the digital phase recovering device, and this average length is a control parameter of the digital phase recovering device) at the multiplier 412 and then inputted to another integrator (the second integrator) consisting of the adder 414, the register 417 and the $2\pi$ modulo calculator 418, wherein the output 404 (the second integrating output) of the second integrator is the offset (namely $N\Delta\omega T$) of the estimated value of the phase offset introduced by the frequency offset.

The digital phase recovering device 401 in FIG. 5 is a digital phase recovering device that incorporates the frequency offset compensating apparatus 407. One output 403 of the frequency offset compensating apparatus 407 is subtracted from the output of the argument calculator 207 to obtain the argument 405 of the symbol having been removed of the phase offset introduced by the frequency offset; another output 404 of the frequency offset compensating apparatus 407 is subtracted from the estimated value 222 of the phase offset, and is removed of the estimated offset introduced by the frequency offset to obtain the argument 406 of the phase offset. The arguments 405 and 406 are subtracted with each other by means of the subtracter 223 to obtain the data information $\phi_d$.

Comparing FIG. 2 with FIG. 5, it suffices to add the first subtracter 402 and the second subtracter 429 to the prior art digital phase recover. The subtracter 429 subtracts the second integrating output 404 of the frequency offset compensating apparatus 407 from the phase offset calculation result of the prior art digital phase offset recover, and the phase offset having been subtracted the second integrating output is fed back to the phase offset calculating device and is subtracted from the output of the phase recover 223 for output. The subtracter 402 subtracts the first integrating output 404 of the frequency offset compensating apparatus 407 from the argument as calculated by the argument calculator 407, and transfers it to the phase recover 223. This is relatively easy for implementation. Under such a circumstance, the subtracter 402 and the subtracter 429 are respectively used as the first interface and the second interface of the present invention.

Additionally, as should be aware to a person skilled in the art, the embodiment as shown in FIG. 5 is only exemplary of, rather than restrictive to, the present invention. For instance, the second integrating output can also be divided into two branches to be respectively directly inputted to the delaying device 213 and the second subtracter 223 as shown in the Figure. And the first integrating output can also be directly outputted to the subtracter 223 and the subtracter 210, respectively. It is thus unnecessary to add further component parts.

Under such a circumstance, the port of the subtracter 210 for use to receive the first integrating output of the frequency offset compensating apparatus 407 and the port of the phase recover 223 for use to receive the first integrating output of the frequency offset compensating apparatus 407 can be generally referred to as the first interface, and the port of the delaying device 213 for use to receive the second integrating output of the frequency offset compensating apparatus 407 and the port of the phase recover 223 for use to receive the second integrating output of the frequency offset compensating apparatus 407 can be generally referred to as the second interface.

As should be additionally noted, the prior art phase offset calculating device as shown in FIGS. 2 and 5 is referred here only for the convenience of explanation, and it should not be understood as restrictive to the present invention. It is also possible to employ any frequency offset calculating device conceivable to persons skilled in the art, insofar as it has the first interface and the second interface capable of receiving the first integrating output and the second integrating output of the in-built frequency offset compensating apparatus 407 according to the present invention.

In comparison with the frequency offset compensating apparatus according to the first embodiment of the present invention as shown in FIG. 3, the frequency offset compensating apparatus and the digital phase recovering device incorporating such an apparatus as shown in FIG. 5 can do without the complex multiplications, thereby greatly reducing the computational complexity. However, it is defective in its compensation range being restricted by the average length in the digital phase recovering device. Suppose the rate of the transmitted symbol be Br and the average length be N, the frequency offset range compensable by the apparatus will be [−Br/2N, Br/2N], whereas the frequency offset compensating apparatus as shown in FIG. 3 can carry out compensation to any random frequency offsets.

Figure 6:
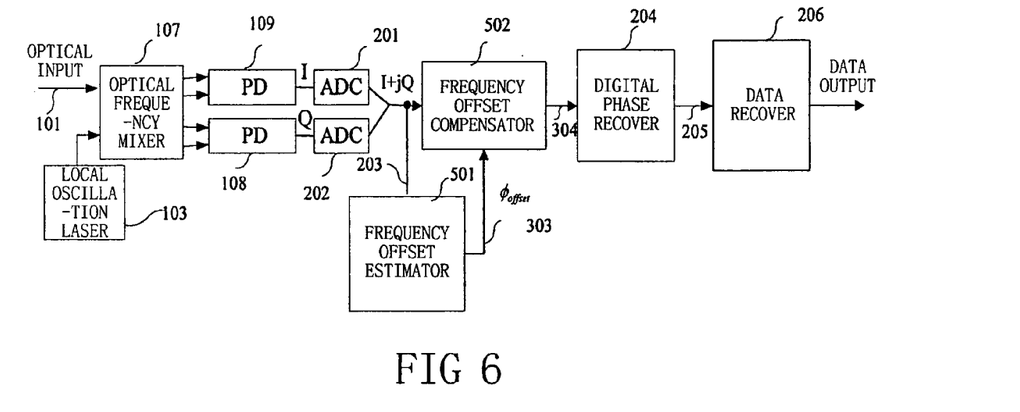
FIG. 6 shows an optical coherent receiver employing the frequency offset compensating apparatus according to the present invention.

FIG. 6 shows an optical coherent receiver employing the frequency offset compensating apparatus according to the present invention. In comparison with FIG. 2, the receiver in FIG. 6 is added with a frequency offset estimator 501 and a frequency offset compensator 502 before the digital phase recover 204. The frequency offset estimator 501 can be realized by the frequency offset estimating apparatus proposed by A. Leven et al. in 2007 ("*Frequency Estimation in Intradyne Reception*" IEEE Photonics Technology Letters, Vol. 19, No. 6, March, 2007, pp 366-368). And the frequency offset compensator 502 can be realized by the frequency offset compensating apparatus 302 shown in FIG. 3A or the frequency offset compensating apparatus 312 shown in FIG. 3B.

Figure 7:
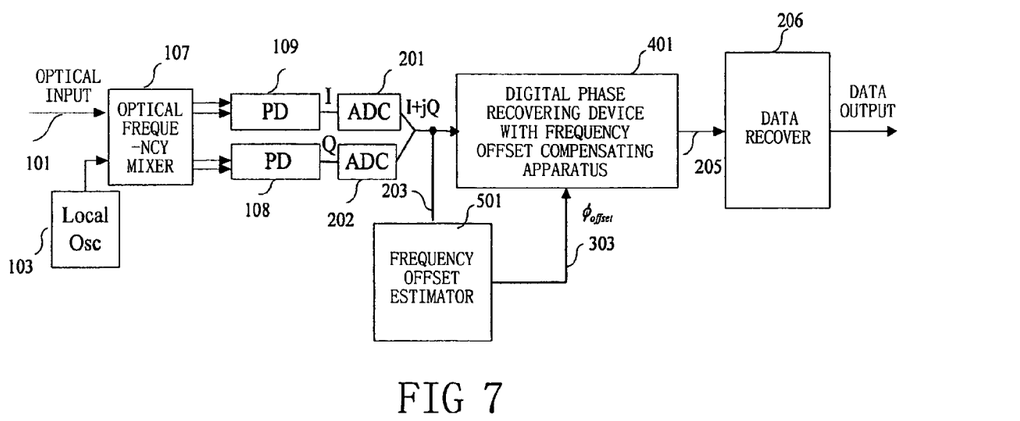
FIG. 7 shows an optical coherent receiver employing the digital phase recovering device that incorporates frequency offset compensation apparatus according to the present invention.

FIG. 7 shows an optical coherent receiver employing the digital phase recovering device 401 with the in-built frequency offset compensating apparatus 407 according to the present invention. The receiver in FIG. 7 makes use of the frequency offset estimator 501 shown in FIG. 6, and the output of the frequency offset estimator 501 is fed into the digital phase recovering device 401 with the in-built frequency offset compensating apparatus 407. The digital phase recovering device 401 compensates the frequency offset at the same time of recovering the phase.

Figure 8:
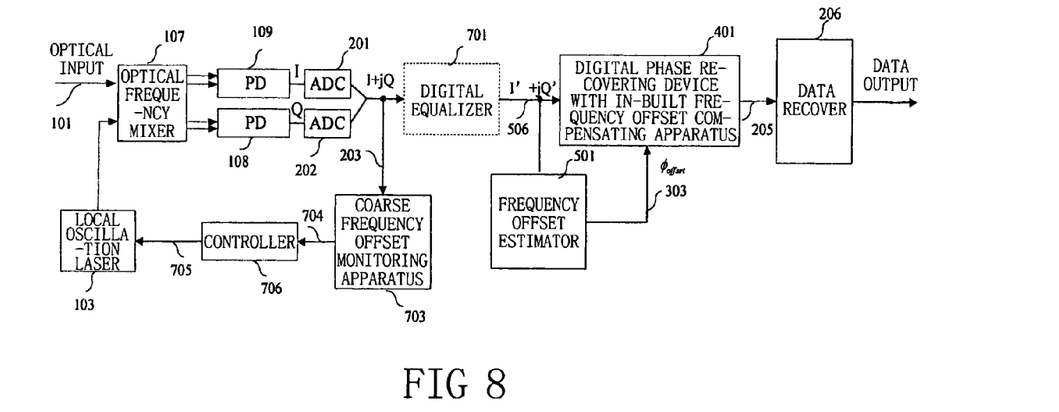
FIG. 8 shows another optical coherent receiver employing the digital phase recovering device that incorporates frequency offset compensation apparatus according to the present invention.

FIG. 8 shows another optical coherent receiver employing the frequency offset compensating apparatus 407 according to the present invention and the digital phase recovering device 401 with the in-built frequency offset compensating apparatus 407. The "coarse frequency offset monitoring apparatus 703" can be realized according to the frequency offset monitor in the Chinese Patent Application 200710139769.1 as invented by Zhenning TAO et al. The polarity of the output of the frequency offset monitor in this patent varies with variations in positivity and negativity of the frequency offset, so that the output of such a monitor can be used as a feedback signal to control the frequency of the local oscillation laser. The monitor has very strong robustness, and can tolerate very high chrominance chromatic dispersion and polarization mode chromatic dispersion and the asynchronous problem of the clocks between the transmitted and received data. But this monitor is problematic in the fact that when the frequency offset is less than a predetermined range (such as 1 GHz), the monitor would send out erroneous monitor signals. As a result, the base band digital signal would contain residual frequency offset. Therefore, the frequency offset compensating apparatus 407 according to the present invention and the digital phase recovering device 401 incorporating the apparatus are applied to the optical coherent receiver to compensate the residual frequency offset in the base band digital signal due to errors of the coarse frequency offset monitor 703. Of the two inputs in the digital phase recovering device 401, one is a base band digital signal. This signal may have been processed by the digital equalizer 701, whose function is to equalize signal damage in the signal due to the chrominance chromatic dispersion and the polarization mode chromatic dispersion inside the channel. The digital equalizer 701 can be realized by known techniques (such as "*Adaptive digital equalization in the presence of chromatic dispersion, PMD, and phase noise in coherent fiber optic systems*", Crivelli, D. E et al., Global Telecommunications Conference, 2004, Page(s): 2545-2551 Vol. 4). The frequency offset estimator 501 estimates the residual frequency offset 303 in the base band signal in accordance with the base band digital signal 203 directly outputted by the ADC or the equalized base band digital signal 506 outputted by the digital equalizer 701. The digital phase recovering device 401 compensates the residual frequency offset at the same time of recovering the phase in accordance with the input 303. In comparison with FIG. 7, FIG. 8 is added with a feedback control loop consisting of the coarse frequency offset monitor etc. to perform preliminary control of the frequency offset, and this offsets the defect of limited compensating range of the digital phase recovering device 401 from the mechanism.

As should be noted, although FIG. 8 shows the frequency offset compensating apparatus 407 and the digital phase recovering device 401 with the in-built frequency offset compensating apparatus 407, recovering of the phase offset and the frequency offset can also be performed by a combination of the frequency offset estimating apparatus shown in FIG. 3 with a prior art phase offset recovering device.

Figure 9:
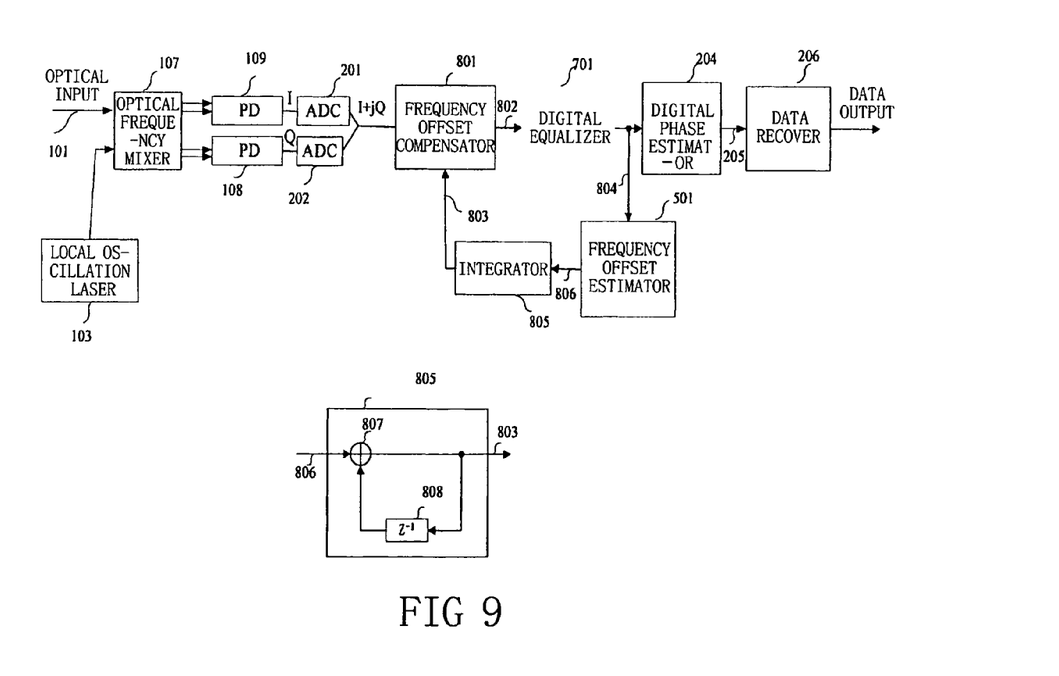
FIG. 9 shows another optical coherent receiver employing the phase offset compensating apparatus according to the present invention.

FIG. 9 shows another optical coherent receiver employing the frequency offset compensating apparatus according to the present invention. The frequency offset compensator 801 in FIG. 9 can be realized by the frequency offset compensating apparatus 302 or 312 as shown in FIG. 3. The input of the frequency offset estimator 501 in FIG. 9 is a signal having been performed with frequency offset compensation, that is to say, the output 806 of the frequency offset estimator 501 is the residual frequency offset having been performed with frequency offset compensation. The output 806 enters the integrator 805, and is added in the integrator 805 to the previously estimated frequency offset in the register 808 by means of the adder 807 to obtain the new frequency offset 803. The new frequency offset 803 is fed into the frequency offset compensator 801 to be performed with frequency offset compensation. Thus, the frequency offset compensator 801, the frequency offset estimator 501 and the integrator 805 in FIG. 8 constitute a feedback loop of frequency offset compensation.

Figure 10:
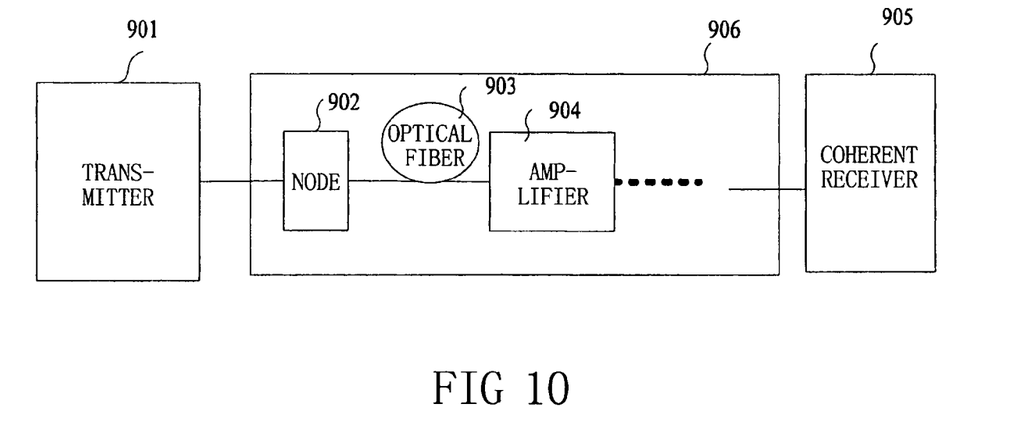
FIG. 10 shows an optical communication system employing the coherent receiver according to the present invention.

FIG. 10 shows an optical communication system employing the optical coherent receiver according to the present invention. This system is composed of a transmitter 901, an optical fiber link 906 and a receiver 905. The optical fiber link can include one or more nodes 902, an optical fiber 903 and an amplifier 904. Except for the optical coherent receiver 905 according to the present invention, the remaining component parts as mentioned above can be formed according to known technologies, such as the transmitter technology published in "*Optical Differential Quadrature Phase-Shift Key (oDQPSK) for High Capacity Optical Transmission*" R. A. Griffin et al., OFC 2002".

The apparatus according to the present invention can also be implemented by computer software, which enables a computer or a logic device (such as a field programmable logic device) to carry out the functions of the aforementioned apparatus or devices, or enables the computer to execute the steps of the corresponding method. The computer can for instance be a general-purpose computer comprising a CPU, an ROM, input and output means, a hard disk, and an RAM etc., and can also be a dedicated computer. The computer program can be a single computer program or a suite of programs consisting of a plurality of computer programs.

The computer program or suite of programs can be stored on a computer readable storage medium, which can for instance be a CD, a DVD, a floppy disk, a flash memory, a magnetic tape or any other media known to persons skilled in the art.

As should be aware to a person skilled in the art, it is possible to make various modifications and variations to the present invention upon practical demand. These modifications and variations are covered by the present invention as long as they fall within the scope as defined in the attached claims.

DRAWINGS

FIG. 1: 101—Optical Input; 103—Local Oscillation Laser; 104—Controller; 105—Loop Filter; 106—Phase Offset Detector; 107—Optical Frequency Mixer; 110—Data Recover; 1—Data Output FIG. 2: 101—Optical Input; 103—Local Oscillation Laser; 107—Optical Frequency Mixer; 110—Data Recover; 204—Digital Phase Recover; 1—Data Output FIG. 3B: 203—Series-parallel Conversion; 304—Parallel-series Conversion; 335—Multi-output Integrator FIG. 5: 303—Frequency Offset Compensating Apparatus FIG. 6: 101—Optical Input; 103—Local Oscillation Laser; 107—Optical Frequency Mixer; 204—Digital Phase Recover; 206—Data Recover; 501—Frequency Offset Estimator; 502—Frequency Offset Compensator; 1—Data Output FIG. 7: 101—Optical Input; 107—Optical Frequency Mixer; 206—Data Recover; 401—Digital Phase Recovering Device With Frequency Offset Compensating Apparatus; 501—Frequency Offset Estimator; 1—Data Output FIG. 8: 101—Optical Input; 103—Local Oscillation Laser; 107—Optical Frequency Mixer; 206—Data Recover; 401—Digital Phase Recovering Device With In-built Frequency Offset Compensating Apparatus; 501—Frequency Offset Estimator; 701—Digital Equalizer; 703—Coarse Frequency Offset Monitoring Apparatus; 706—Controller; 1—Data Output FIG. 9: 101—Optical Input; 103—Local Oscillation Laser; 107—Optical Frequency Mixer; 204—Digital Phase Estimator; 206—Data Recover; 501—Frequency Offset Estimator; 701—Digital Equalizer; 801—Frequency Offset Compensator; 805—Integrator; 1—Data Output FIG. 10: 901—Transmitter; 902—Node; 903—Optical Fiber; 904—Amplifier; 905—Coherent Receiver

The invention claimed is:

1. A frequency offset compensating apparatus for an optical coherent receiver including a front end processor and a frequency offset estimator, of which said front end processor converts an inputted optical signal into a base band digital electric signal, and said frequency offset estimator estimates a phase offset change introduced by a frequency offset in said base band digital electric signal;

said frequency offset compensating apparatus comprising:

an M output integrator, for integrating the phase offset change introduced by the frequency offset and estimated by said frequency offset estimator to acquire M inverse numbers of the phase offset introduced by the frequency offset, where M is an integer greater than 1;

a series-parallel converting device, for dividing said base band digital electric signal into M sub base band digital electric signals;

M complex multipliers, for constructing the corresponding inverse numbers in the M inverse numbers outputted by said M output integrator to be complex numbers, and multiplying them with the corresponding sub base band digital electric signals in the M sub base band digital electric signals converted by said series-parallel converting device; and a parallel-series converting device, for converting the M sub base band digital electric signals multiplied by said complex multipliers into a base band electric signal.

2. The frequency offset compensating apparatus according to claim 1, wherein said M output integrator comprises a multiplier, a delaying unit and M integrating units arranged in series, wherein said multiplier multiplies the phase offset change introduced by the frequency offset and estimated by said frequency offset estimator with −1 to acquire an inverse number of the phase offset change introduced by the frequency offset, which inverse number is inputted into each of the integrating units;

each integrating unit in said M integrating units arranged in series integrates the inputted phase offset change to acquire a phase offset introduced by the frequency offset;

an integrating output of the last integrating unit in said M integrating units arranged in series is inputted into the corresponding complex multiplier and simultaneously outputted into said delaying unit, and integrating outputs of the remaining integrating units in said M integrating units arranged in series are inputted into the corresponding complex multipliers and simultaneously inputted into the next integrating unit; and the first integrating unit in said M integrating units arranged in series integrates the inverse number and the integrating output of the last integrating unit having been delayed one symbol by said delaying unit.

3. The frequency offset compensating apparatus according to claim 2, wherein each of said integrating units comprises an adder and a 2π modulo calculator arranged in series, the adder of the first integrating unit in said M integrating units arranged in series adds the inverse number to the integrating output of the last integrating unit having been delayed by said delaying unit, said 2π modulo calculator performs a 2π modulo calculation on the addition result of the adder; the adder of each of the integrating units other than the first integrating unit in said M integrating units arranged in series adds the inverse number to an output of the previous integrating unit, and said 2π modulo calculator performs a 2π modulo calculation on the addition result of the adder.

4. The frequency offset compensating apparatus according to claim 1, wherein said M output integrator comprises a delaying unit and M integrating units arranged in parallel, an output of said delaying unit is inputted into each of the integrating units in said M integrating units arranged in parallel;

each of the integrating units in said M integrating units arranged in parallel integrates the inputted phase offset change introduced by the frequency offset, outputs the phase offset introduced by the frequency offset of each symbol, namely integrating output, and respectively inputs the integrating output into the corresponding complex multiplier; and the last integrating unit, namely the Mth integrating unit, in said M integrating units arranged in parallel further inputs its integrating output into said delaying unit, and said delaying unit delays the integrating output by one symbol as the output of said delaying unit to be inputted into each of the integrating units.

5. The frequency offset compensating apparatus according to claim 4, wherein each of the integrating units in said M integrating units arranged in parallel comprises a multiplier, an adder and a 2π modulo calculator, of which the multiplier of each integrating unit is respectively multiplied with −1 to −M;

the adder of each integrating unit adds the output of the multiplier to the output of the last integrating unit in said plurality of integrating units arranged in parallel; and the 2π modulo calculator of each integrating unit performs 2π modulo calculation on the addition result of the adder.

6. An optical coherent receiver, comprising a front end processor, for changing an inputted optical signal into a base band electric signal, a frequency offset estimator, for estimating a frequency offset in said base band electric signal; and a frequency offset compensating apparatus for compensating a phase offset introduced by the frequency offset in said base band electric signal in accordance with the frequency offset estimated by said frequency offset estimator and comprising:

an M output integrator, for integrating the phase offset change introduced by the frequency offset and estimated by said frequency offset estimator to acquire M inverse numbers of the phase offset introduced by the frequency offset, where M is an integer greater than 1;

a series-parallel converting device, for dividing said base band digital electric signal into M sub base band digital electric signals;

M complex multipliers, for constructing the corresponding inverse numbers in the M inverse numbers outputted by said M output integrator to be complex numbers, and multiplying them with the corresponding sub base band digital electric signals in the M sub base band digital electric signals converted by said series-parallel converting device; and a parallel-series converting device, for converting the M sub base band digital electric signals multiplied by said complex multipliers into a base band electric signal.

7. The optical coherent receiver according to claim 6, characterized in further comprising:

a coarse frequency offset compensating unit, for coarsely compensating the frequency offset of the base band electric signal outputted by said front end processor;

wherein said frequency offset estimator estimates the frequency offset of the base band electric signal having been coarsely compensated by said coarse frequency offset compensating unit.

8. The optical coherent receiver according to claim 6, wherein said optical coherent receiver further comprises a digital equalizer and an integrator;

wherein said front end processor is connected to said frequency offset compensating apparatus, and said frequency offset compensating apparatus is connected to said digital equalizer;

said digital equalizer equalizes the base band electric signal having been compensated by said frequency offset compensating apparatus, and inputs the equalized signal into said frequency offset estimator;

said frequency offset estimator estimates the frequency offset in the signal outputted by said digital equalizer, and outputs the frequency offset into said integrator; and said integrator integrates the frequency offset, and outputs the integrated signal into said frequency offset compensating apparatus.

\* \* \* \* \*